US012664118B2

(12) United States Patent
Yang et al.

(10) Patent No.: US 12,664,118 B2
(45) Date of Patent: Jun. 23, 2026

(54) COMMUNICATION SYSTEM AND COMMUNICATION METHOD

(71) Applicant: Silergy Semiconductor Technology (Hangzhou) LTD, Hangzhou (CN)

(72) Inventors: Yuanyu Yang, Hangzhou (CN); Xiaoqiang Xu, Hangzhou (CN); Zongquan Zhang, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 90 days.

(21) Appl. No.: 18/620,244

(22) Filed: Mar. 28, 2024

(65) Prior Publication Data

US 2024/0330227 A1     Oct. 3, 2024

(30) Foreign Application Priority Data

Mar. 31, 2023     (CN) .......................... 202310342521.4

(51) Int. Cl.
| | |
|---|---|
| *G06F 13/42* | (2006.01) |
| *G06F 13/362* | (2006.01) |
| *G06F 13/40* | (2006.01) |
| *G06F 16/955* | (2019.01) |

(52) U.S. Cl.
CPC ........ *G06F 13/4068* (2013.01); *G06F 13/362* (2013.01)

(58) Field of Classification Search
None
See application file for complete search history.

(56) References Cited

U.S. PATENT DOCUMENTS

| | | | | |
|---|---|---|---|---|
| 3,750,110 | A * | 7/1973 | Martin | G06F 13/38 |
| | | | | 713/400 |
| 5,555,510 | A * | 9/1996 | Verseput | H02H 9/004 |
| | | | | 307/38 |
| 10,055,376 | B1 * | 8/2018 | Newkirk | G06F 13/4068 |
| 10,102,177 | B2 * | 10/2018 | Yoshida | G06F 13/4282 |
| 10,356,824 | B2 | 7/2019 | Qiao et al. | |
| 2001/0030904 | A1 * | 10/2001 | Farmwald | G11C 7/1072 |
| | | | | 711/E12.089 |
| 2005/0120159 | A1 * | 6/2005 | Polizzi | G11C 16/06 |
| | | | | 711/1 |
| 2007/0019486 | A1 * | 1/2007 | Vo | G11C 7/1051 |
| | | | | 365/207 |
| 2011/0289239 | A1 * | 11/2011 | Zeng | G06F 13/4282 |
| | | | | 710/51 |
| 2017/0017593 | A1 * | 1/2017 | Lunadier | G06F 13/4022 |
| 2018/0090185 | A1 * | 3/2018 | Hossain | G11C 7/1012 |
| 2020/0111342 | A1 * | 4/2020 | Hummer | H04B 1/3888 |

(Continued)

*Primary Examiner* — Hyun Nam

(57) ABSTRACT

A communication system can include: at least two communication channels, each of which comprises at least one chip coupled in series, wherein each chip comprises a communication input pin, a communication output pin, and at least one addressing pin, and connections of the addressing pin in the chip comprise one of floating, coupling with the communication input pin of the chip, and coupling with the communication output pin of the chip; and a master device configured to identify each communication channel according to level information of each addressing pin of at least first chip in each communication channel, where the first chip in each communication channel is connected to a corresponding output port of the master device.

20 Claims, 3 Drawing Sheets

(56) References Cited

U.S. PATENT DOCUMENTS

| | | | |
|---|---|---|---|
| 2021/0064508 A1* | 3/2021 | Troia .................. | G06F 11/0775 |
| 2021/0240656 A1* | 8/2021 | Rumpler .............. | G06F 9/4411 |
| 2022/0038305 A1* | 2/2022 | Vivar ................. | G06F 13/4282 |
| 2022/0292034 A1* | 9/2022 | Humm ................ | H04L 61/5038 |
| 2023/0179668 A1 | 6/2023 | Lin et al. | |
| 2023/0195681 A1* | 6/2023 | Bernardinis ........ | G06F 13/4291 |
| | | | 710/105 |
| 2023/0253036 A1* | 8/2023 | Oh ....................... | G11C 7/1021 |
| | | | 365/221 |
| 2024/0330227 A1* | 10/2024 | Yang .................... | G06F 13/362 |

* cited by examiner

COMMUNICATION SYSTEM AND COMMUNICATION METHOD

RELATED APPLICATIONS

This application claims the benefit of Chinese Patent Application No. 202310342521.4, filed on Mar. 31, 2023, which is incorporated herein by reference in its entirety.

FIELD OF THE INVENTION

The present invention generally relates to the field of communications, and more particularly, to communication systems and methods.

BACKGROUND

Communication is often needed between a master and multiple slave devices. In order to avoid conflicts of slave devices during communication, each slave device requires a unique address. As shown in FIG. 1, a schematic block diagram of an example communication system can include a master device and four columns of the same slave devices. Each column can include a plurality of slave devices that are serially connected. The four output ports MDO1-MDO4 of the master device may respectively be connected to the first slave device in each column to distinguish different columns, and the master device may transmit commands to the slave devices in different columns.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In some approaches, the number of the output ports of the master device can be the same as the number of the columns of the slave devices. The more columns, the more output ports of the master device needs, so application costs of the communication system can accordingly increase. Hence, it is necessary to provide a communication system that can reduce the number of the output ports of the master device when the number of the columns of the slave devices stays unchanged, such that the columns of slave devices may be distinguished by one output ports of the master device, thereby decreasing application costs of the communication system.

Figure 1:
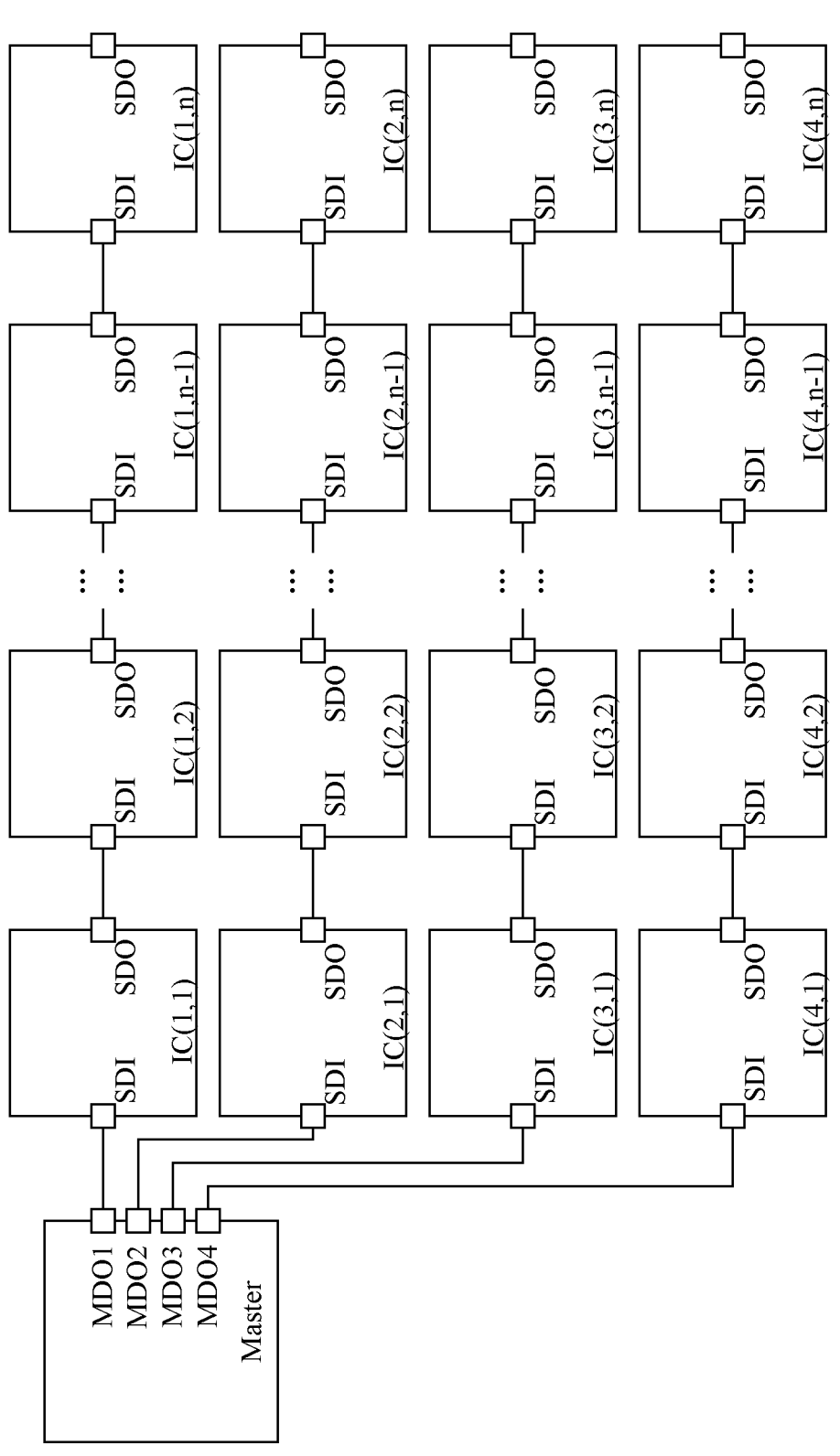
FIG. 1 is a schematic block diagram of an example communication system.
Figure 2:
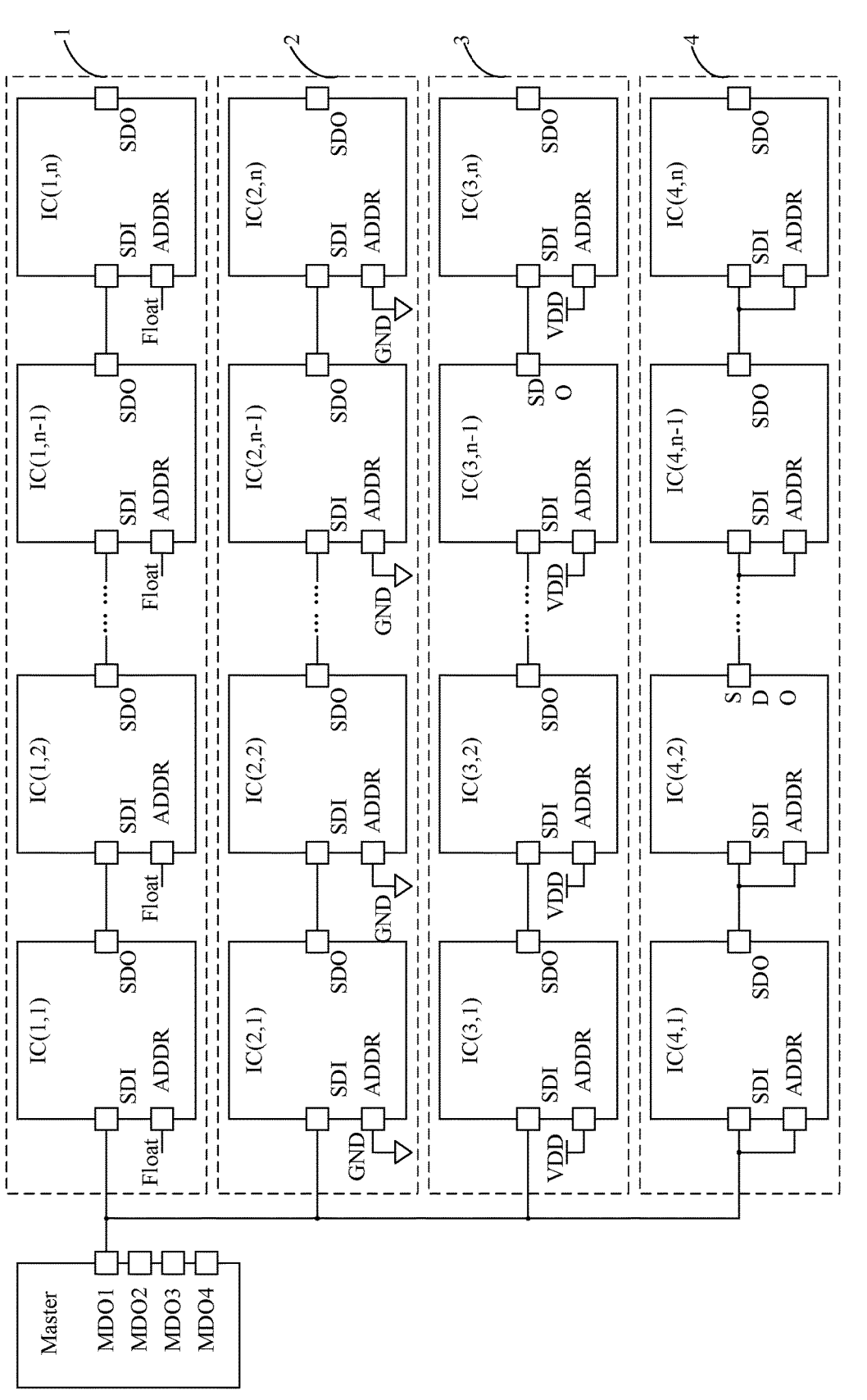
FIG. 2 is a schematic block diagram of a first example communication system, in accordance with embodiments of the present invention.

Referring now to FIG. 2, shown is a schematic block diagram of a first example communication system, in accordance with embodiments of the present invention. In this particular example, the communication system can include a master device (Master) and four communication channels: 1, 2, 3, and 4. Each communication channel can include n chips connected in serial, whereby n is a positive integer. For example, the ith communication channel can include n chips IC(i,j) connected in serial, where i=1, 2, 3, 4, and 1≤j≤n, and both i and j are positive integers. Also, each chip can include communication input pin SDI, communication output pin SDO, and addressing pin ADDR. Communication input pin SDI of the first chip IC(i,1) in each communication channel can connect to the output port MDO1 of the master device. The communication input pins SDI of the second chip IC(i,2) to the nth chip IC(i,n) in each communication channel may respectively be connected to the communication output pins SDO of the first chip IC(i,1) to the (n−1)th chip IC(i,n−1). For example, communication input pin SDI of the second chip IC(i,2) can connect to communication output pin SDO of the first chip IC(i,1), communication input pin SDI of the third chip IC(i,3) can connect to communication output pin SDO of the second chip IC(i,2), and so on, and communication input pin SDI of the nth chip IC(i,n) can connect to communication output pin SDO of the (n−1)th chip IC(i,n−1).

In particular embodiments, communication output pin SDO of the nth chip IC(i,n) may not be connected to an input port (e.g., MDI) of the master device, and there may be no need to form a circular serial communication system as long as the communication system can implement unidirectional data transmission. In another example, communication output pin SDO of the nth chip IC(i,n) can connect to the input port MDI of the master device to form a circular serial communication system. Each chip can also include a communication and processing unit that can forward a communication data packet or a command received from the chip, or process the communication data packet or the command and forward the processed communication data packet or the processed command. The processing of the communication data packet can include modifying the associated data in the communication data packet. In particular embodiments, each communication channel can include n chips connected in serial, but other arrangements may be supported in certain embodiments. Also, the number of the chips included in each communication channel may be different or the same as exemplified herein.

In particular embodiments, the addressing pins of the all chips in the same communication channel may perform the same connection, and the addressing pins of the chip in the different communication channels may perform different connections, such that each of connection of the addressing pin can correspond to one column address of the corresponding communication channel. The master device may distinguish each communication channel according to the connection of each addressing pin of at least one chip in each communication channel.

The connections of the addressing pin in the chip can include one of floating, coupling with the communication input pin of the chip, and coupling with the communication output pin of the chip. For example, the connections of the addressing pin in the chip can include at least three of coupling with a power supply terminal, coupling with a ground terminal, coupling with the communication input pin of the chip, coupling with the communication output pin of the chip, and floating. Thus, three and more than three different signals may be inputted into the one addressing pin to encode three and more than three column addresses.

In particular embodiments, the addressing pins of all chips in communication channel 1 can be floating such that the column addresses of all chips in communication channel 1 are encoded as column address 1 (e.g., 00). The addressing pins of all chips in communication channel 2 can connect to the ground terminal GND such that the column addresses of all chips in communication channel 2 are encoded as column address 2 (e.g., 01). Also, the ground terminal GND herein may be the ground terminal of the chip or the ground terminal of the other apparatuses outside the chip. The addressing pins of all chips in communication channel 3 can connect to power supply terminal VDD of the chip such that the column addresses of all chips in communication channel 3 are encoded as column address 3 (e.g., 10). It should be understood that power supply terminal VDD herein may be the power supply terminal of the chip or be the power supply terminal of the other apparatus outside the chip. In an address configuration time interval, the communication input pin of the chip may receive a pulse-width modulation (PWM) signal (e.g., any suitable signal with the high level and the low level) to detect the connection that the addressing pin is coupled with the communication input pin of the chip. The addressing pins of all chips in communication channel 4 can connect to communication input pin SDI of the chip, such that the column addresses of all chips in communication channel 4 are encoded as column address 4 (e.g., 11). In other examples, the communication input pin may be replaced by the communication output pin or another alternative pin.

For example, the chip can also include an address extension circuit. The address extension circuit can identify different level information of the addressing pin corresponding to the different connections of the addressing pin of the chip, in order to determine the connection of each addressing pin, thereby configuring and encoding the column address of the chip. Such determinations can include the level information being in a high fixed level state or high-level state (e.g., the addressing pin is coupled with the power supply terminal), the level information being a low fixed level state or low-level state (e.g., the addressing pin is coupled with the ground terminal), and the level information changing according to a change of the level state inside the chip, determining that the addressing pin is floating. When identifying that the level information is equivalent to the PWM signal received by the address pin, and the PWM signal may present high and low level states within a certain time interval, it can be determined that the addressing pin is coupled with the communication input pin, the communication output pin, or other substitute pins of the chip. After determining the connection of each addressing pin, the address extension circuit can perform different column address coding according to different connections of the addressing pin. Any suitable address extension circuit that identifies several different level information of the addressing pin to determine the connection of the addressing pin and performs column address coding of the chip may be utilized in certain embodiments.

When particular embodiments are used to configure the column addresses and one chip has N addressing pins, the at most 4N column addresses can be configured; therefore, the column addresses of the chip expand without increasing the addressing pin. For example, when it is determined that the number of the communication channels is four, the connection of each chip in each communication channel can be the same. Thus, each addressing pin of the chips in the four communication channels may have four connections. When the number of the communication channels increases, the connections of the addressing pin of the chips in the communication channels may correspondingly increase, or the number of the addressing pins of the chip may correspondingly increase. When the number of the communication channels decreases, the connections of the addressing pins of the chips in the communication channels may correspondingly decrease, or the number of the addressing pins of the chip may correspondingly decrease.

In particular embodiments, the connections of the addressing pin can also include coupling with communication output pin SDO of the chip or making arbitrary connections, and any suitable method of distinguishing different communication channels according to the different connections of the addressing pins can be utilized in certain embodiments. For example, the communication in particular embodiments can be a one-wire communication, I2C communication, or any suitable communication arrangement.

An example communication method can include the following steps. The master device can transmit an address configuration command, and each chip in the communication channel when receiving the address configuration command or the communication data packet may serve as a current chip. In each communication channel, the current chip (e.g., chip IC(1,3) in communication channel 1) may receive the address configuration command from the master device or the last chip (e.g., chip IC(1,2) in communication channel 1) to enter an address configuration time interval, and can transmit the address configuration command to the next chip. In the address configuration time interval, each chip can encode the column address of the chip according to the connection of each addressing pin of the chip. For example, in the address configuration time interval, the communication input pin of the chip may receive the PWM signal such that the chip detects the connection that the addressing pin of the chip is coupled to the communication input pin of the chip itself.

The master device can transmit a communication data packet including column address data and row address data. The column address data in particular embodiments may distinguish different communication channels, and the row address data may distinguish the positions of the chips in the particular communication channel. The row address data transmitted by the master device may indicate the data associated with the row address, and may be specific row address or the initial value of the row address. For example, the type of the row address data transmitted by the master device can be related to the addressing mode of the row address in the communication. In each communication channel, communication input pin SDI of the current chip may receive the communication data packet from the master device or the last chip, and can compare the column address data and the row address data in the received communication data packet against the column address and the row address of the current chip, respectively. The row address of the chip may similarly indicate the data associated with the row address, and may be a specific row address or the associated particular data configured to ensure the row address. For example, the type of the row address of the chip can be related to the addressing mode of the row address in the communication.

When the column address data and the row address data is consistent with (matches) the column address and the row address, respectively, the current chip may serve as the target chip in the communication and implement corresponding commands in the communication data packet. In one embodiment, when the current chip serves as the target chip in the communication, the current chip may not transmit the communication data packet to the next chip. In another embodiment, when the current chip serves as the target chip in the communication, the communication data packet may still be transmitted (e.g., the current chip forwards the communication data packet to the next chip).

When the column address data is inconsistent with (does not match) the column address and/or the row address data does not match the row address, the current chip can forward the communication data packet to the next chip, and the current chip may not modify the column address data in the communication data packet. The other part in the communication data packet may be or not be modified. In one embodiment, the current chip can modify the row address data in the communication data packet. In another embodiment, the current chip may not modify the row address data in the communication data packet. Whether the current chip modifies the row address data in the communication data packet can be related to the addressing mode of the row address in the communication.

In particular embodiments, a second communication method can include the following steps. In the second communication method, only the first chip in each communication channel may be required to detect the connection of each addressing pin of the first chip to perform addressing initialization. Thus, encoding the column address of the first chip, and other chips in each communication channel may not need to detect the connection of each addressing pin thereof. The master device can transmit the address configuration command. The first chip in each communication channel may receive the address configuration command from the master device to enter the address configuration time interval. In the address configuration time interval, the first chip can encode the column address of the first chip according to the connection of each addressing pin of the first chip. In the address configuration time interval, the communication input pin of the first chip may receive the PWM signal, such that the first chip can detect the connection that the addressing pin of the first chip is coupled with the communication input pin of the first chip. The master device may transmit the communication data packet including the column address data and the row address data.

In each communication channel, communication input pin SDI of the first chip may receive the communication data packet transmitted by the master device, and can compare the column address data in the received communication data packet against the column address of the first chip. The communication channel may serve as a current communication channel when the first chip of the communication channel receives the communication data packet. When the column address data matches the column address, the current communication channel may serve as the target communication channel in the communication. Then, the target chip can be identified in the target communication channel according to the row address data in the communication data packet. Each chip in the current communication channel when receiving the communication data packet may serve as the current chip.

The current chip can compare the row address data in the received communication data packet against the row address of the current chip to identify whether the current is the target chip. For example, when the row address data matches the row address of the current chip, the current chip may serve as the target chip in the communication and implement the corresponding commands in the communication data packet, and continue to forward or does not continue to forward the communication data packet to the next chip in the current communication channel. When the row address data does not match the row address, the current chip may forward the communication data packet to the next chip in the current communication channel.

When the column address data does not match the column address, the current communication channel may not serve as the target communication channel in the communication, and the first chip may not forward the communication data packet to the next chip in the current communication channel. Here, communication output pin SDO of the first chip in the current communication channel may not output any signal.

In particular embodiments, the connection of the addressing pins of the n chips in the same communication channel can be same, and the connections of the addressing pins of the chip in the different communication channels can be different. For example, each communication channel can be made into one circuit board, and the layouts of the circuit boards (e.g., PCB or an aluminum substrate) of the four communication channels can be different. In some cases, the four different communication channels can be made into four different circuit boards.

Figure 3:
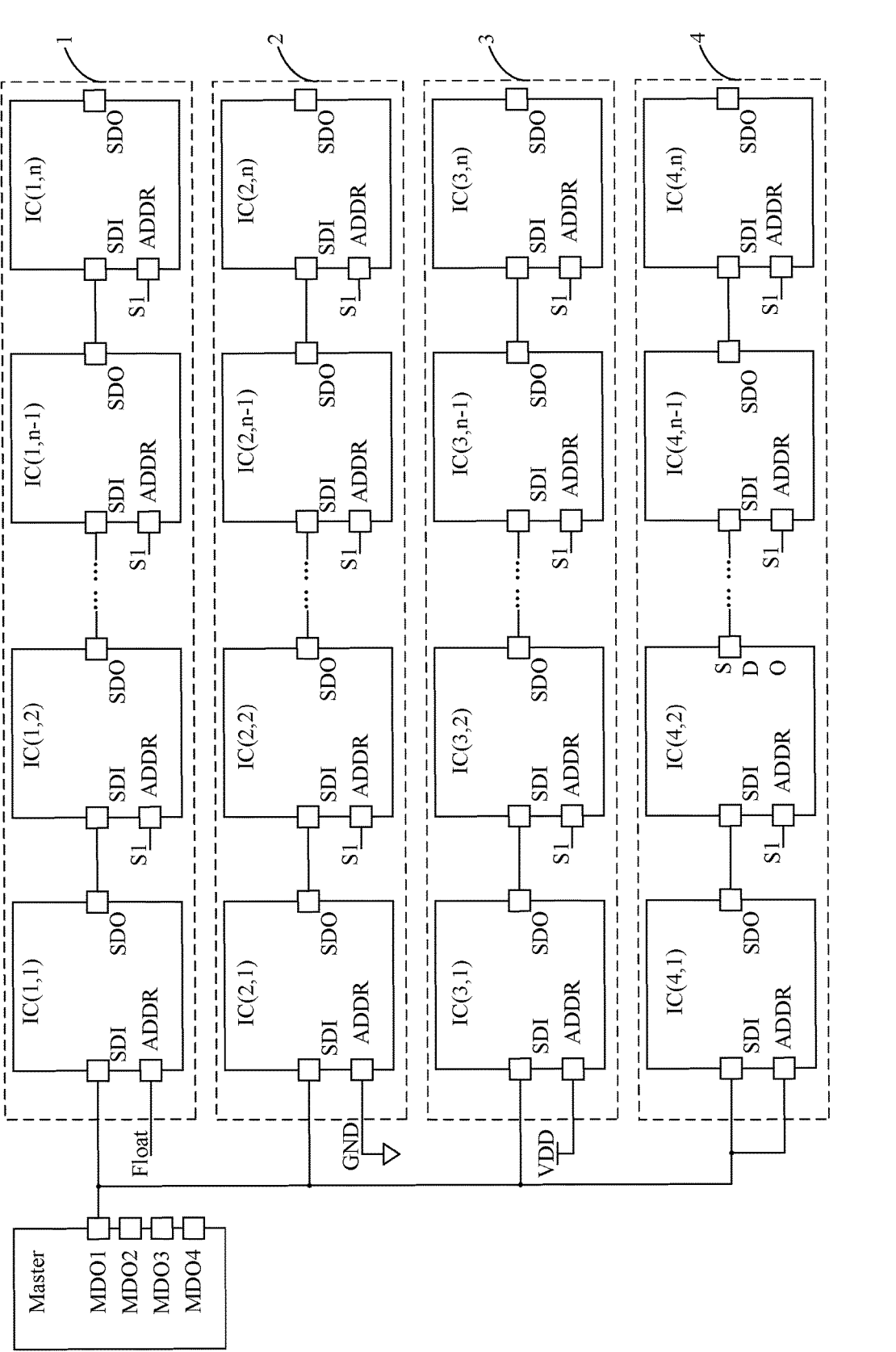
FIG. 3 is a schematic block diagram of a second example communication system, in accordance with embodiments of the present invention.

Referring now to FIG. 3, shown is a schematic block diagram of a second example communication system, in accordance with embodiments of the present invention. In this particular example, the addressing pins of the first chips in the different communication channels may perform different connections. Also, the master device may identify each communication channel according to the different connections of addressing pins ADDR of the first chips in the different communication channels.

In one embodiment, the addressing pins of the second chip to the last chip in the all communication channels can be coupled to S1, which may represent that the same connection is performed. For example, the addressing pins of the first chips in the different communication channels may perform different connections, and the addressing pins of the second chip to the last chip in the all communication channels may perform the same connection, where S1 represents any connection point including no connection point. In particular embodiments, each communication channel can be manufactured as one circuit board, and the addressing pin of the first chip in each communication channel may be brought out by the leads of the respective circuit board and can connect to the outside of the respective circuit board or the other circuit board by utilizing a corresponding inserting component to perform different connections on the outside of the respective circuit board or the other circuit board. Therefore, the circuit boards (e.g., PCB or an aluminum substrate) of the four communication channels can be the same and universal. When the four communication channels are distinguished, the column address can be encoded according to the connection of the signal line led out to the other circuit board from the addressing pin of the first chip in each communication channel. In one embodiment, the different column address configuration may be set according to the connection of the signal line led out a master board from the addressing pin of the first chip in each communication channel.

In particular embodiments, a third communication method can include transmitting the address configuration command, and each chip in the communication channel when receiving the address configuration command or the communication data packet may serve as the current chip. In each communication channel, the current chip may receive the address configuration command from the master device or the last chip to enter the address configuration time interval and transmits the address configuration command to the next chip. In the address configuration time interval, each chip can encode the column address of the chip according to the connection of each addressing pin of the chip. For example, in the address configuration time interval, the communication input pin of the chip may receive the PWM signal, such that the chip detects the connection that the addressing pin of the chip is coupled with the communication input pin of the chip.

The master device can transmit the communication data packet including the column address data and the row address data. In each communication channel, the current chip may receive the communication data packet from the master device or the last chip, and can compare the column address data and the row address data in the received communication data packet against the column address and the row address of the current chip, respectively. When the column address data and the row address data match the column address and the row address, respectively, the current chip may serve as the target chip in the communication and implements corresponding commands in the communication data packet. In one embodiment, when the current chip serves as the target chip in the communication, the current chip may not transmit or forward the communication data packet to the next chip. In another embodiment, when the current chip serves as the target chip in the communication, the communication data packet may still be transmitted or forwarded by the current chip. For example, the current chip can modify the column address in the communication data packet and forwards the modified communication data packet to the next chip.

When the column address data does not match the column address and/or the row address data does not match the row address, the current chip can modify the column address in the communication data packet and forward the modified communication data packet to the next chip. Also, other portions in the communication data packet may be or not be modified. The row address data in the communication data packet may be or not be modified, which can be related to the addressing mode of the row address. In one embodiment, when the coding of the column addresses of the second chip to the last chip in the all communication channels are 0 (may be 00 or 0000), the modifying the column address data performed by the current chip can include the current chip subtracting the column address of the current chip from the column address data in the received communication data packet, or subtracting the column address data in the received communication data packet from the column address of the current chip. In one embodiment, when the coding of the column addresses the second chip to the last chip in the all communication channels are 0 (may be 00 or 0000), the modifying the column address data performed by the current chip can include the current chip performing an XOR operation on the column address data in the received communication data packet and the column address of the current chip.

The above description includes example calculation methods of modifying the column address data when the coding of the column addresses of the second chip to the last chip in the all communication channels are 0. The coding of the column addresses the second chip to the last chip in the all communication channels may be not 0, and any calculation method of modifying the column address data can guarantee that the column addresses of the second chip to the last chip in the communication channel are all selected when the column address of the first chip in the communication channel is selected. Also, the column addresses of the second chip to the last chip in the communication channel not being selected when the column address of the first chip in the communication channel is not selected can also be supported in certain embodiments. When the column address data in the received communication data packet matches the column address of the chip, the column address of the chip can be selected.

The communication system in particular embodiments may utilize the second communication method discussed above to communicate. In another embodiment, the addressing pins of the second chip to the last chip in the all communication channels can be coupled to S1, which may represent arbitrary connections. Thus, the addressing pins of the second chip to the last chip in the all communication channels can make arbitrary connections in some cases. In the above example communication methods, the addressing mode of the row address in each communication channel may be any well-known addressing method of the row address, and can include the addressing mode of initializing the row address and not initializing the row address.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A communication system, comprising:
at least two communication channels, each of which comprises at least two chips coupled in series, wherein each chip comprises a communication input pin, a communication output pin, and at least one addressing pin, and electrical connections of the addressing pin in the chip comprise one of floating, electrical coupling with the communication input pin of the chip, and electrical coupling with the communication output pin of the chip;
b) a master device configured to identify each communication channel according to level information of each addressing pin of at least a first chip in each communication channel, wherein the communication input pin of the first chip in each communication channel is connected to a same output port of the master device, and the addressing pin of each chip is not connected to the master device, and the addressing pin of each chip is not connected to the master device; and
c) wherein the addressing pins of the at least first chip in different communication channels perform different electrical connections such that each electrical connection of the addressing pin of the at least first chip in each communication channel corresponds to one column address of the corresponding communication channel.

2. The system of claim 1, wherein the connections of the addressing pin of the chip comprises at least three of coupling with a power supply terminal, coupling with a ground terminal, coupling with the communication input pin of the chip, coupling with the communication output pin of the chip, and floating.

3. The system of claim 1, wherein the addressing pins of the all chips in the same communication channel perform same connection, and the addressing pins of the chips in the different communication channels perform different connections.

4. The system of claim 1, wherein the addressing pins of the first chips in the different communication channels perform different connections.

5. The system of claim 4, wherein the addressing pins of a second chip to a last chip in the all communication channels perform a same connection.

6. The system of claim 4, wherein the addressing pins of a second chip to a last chip in the all communication channels perform arbitrary connections.

7. The system of claim 1, wherein:
a) the master device transmits an address configuration command, and each chip in the communication channel, when receiving the address configuration command serves as a current chip;
b) in each communication channel, the current chip receives the address configuration command from the master device or a previous chip to enter an address configuration time interval, and transmits the address configuration command to a next chip; and
c) each chip in the address configuration time interval obtains a column address of the chip according to the connection of each addressing pin of the chip.

8. The system of claim 1, wherein:
a) the master device transmits an address configuration command;
b) the first chip in each communication channel receives the address configuration command from the master device to enter an address configuration time interval; and
c) the first chip in the address configuration time interval obtains a column address of the first chip according to the connection of each addressing pin of the first chip.

9. The system of claim 3, wherein:
a) the master device transmits a communication data packet comprising column address data and row address data, and each chip in the communication channel when receiving the communication data packet serves as a current chip;
b) in each communication channel, the current chip receives the communication data packet from the master device or a previous chip, and respectively compares the column address data and the row address data in the communication data packet received by the current chip against the column address and a row address of the current chip;
a) when the column address data and the row address data respectively match the column address and the row address, the current chip serves as a target chip in the communication and implements corresponding commands in the communication data packet; and
b) when the column address data does not match the column address and/or the row address data does not match the row address, the current chip forwards the communication data packet received by the current chip to a next chip, wherein the current chip does not modify the column address data in the communication data packet received by the current chip.

10. The system of claim 5, wherein:
a) the master device transmits a communication data packet comprising column address data and row address data, and each chip in the communication channel when receiving the communication data packet serves as a current chip;
b) in each communication channel, the current chip receives the communication data packet from the master device or a previous chip, and respectively compares the column address data and the row address data in the communication data packet received by the current chip against the column address and a row address of the current chip;
c) when the column address data and the row address data respectively match the column address and the row address, the current chip serves as a target chip in the communication and implements corresponding commands in the communication data packet; and
d) when the column address data does not match the column address and/or the row address data does not match the row address, the current chip modifies the column address data in the communication data packet received by the current chip and forwards the modified communication data packet to a next chip.

11. The system of claim 10, wherein when coding of the column addresses the second chip to the last chip in the all communication channels is 0, a calculation method of modifying the column address data performed by the current chip comprises one of:
a) the current chip subtracts the column address of the current chip from the column address data in the communication data packet received by the current chip;
b) the current chip subtracts the column address data in the communication data packet received by the current chip from the column address of the current chip; and
c) the current chip performs XOR on the column address data in the communication data packet received by the current chip and the column address of the current chip.

12. The system of claim 1, wherein:
a) the master device transmits a communication data packet comprising column address data and row address data;
b) the first chip in each communication channel receives the communication data packet transmitted by the master device, and compares the column address data in the communication data packet against the column address of the first chip, wherein the communication channel serves as a current communication channel when the first chip of the communication channel receives the communication data packet;
c) when the column address data matches the column address, the current communication channel serves as a target communication channel in the communication, and addressing of the row address is performed on the chips in the target communication channel according to the row address data in the communication data packet; and
d) when the column address data does not match the column address, the current communication channel does not serve as the target communication channel in the communication, and the first chip in the current communication channel does not forward the communication data packet to the next chip.

13. A communication method for a communication system comprising a master device and at least two communication channels, wherein each channel comprises at least two chips coupled in series, and each chip comprises a communication input pin, a communication output pin, and at least one addressing pin, the method comprising:

a) transmitting an address configuration command by the master device;

b) receiving the address configuration command by at least first chip in each communication channel to enter an address configuration time interval;

c) in the address configuration time interval, encoding a column address of the chip by the at least one first chip in each communication channel according to level information of each addressing pin of the chip, wherein electrical connections of the addressing pin in the chip comprises one of floating, electrical coupling with the communication input pin of the chip, and electrical coupling with the communication output pin of the chip, and wherein the addressing pins of the at least one first chip in each different communication channel perform different electrical connections such that each electrical connection of the addressing pin of the at least first chip in each communication channel corresponds to one column address of the corresponding communication channel;

d) transmitting a communication data packet and identifying each communication channel according to the column address of the at least one first chip in each communication channel by the master device; and e) wherein the communication input pin of the first chip in each communication channel is connected to a same output port of the master device, and the addressing pin of each chip is not connected to the master device.

14. The method of claim 13, wherein the connections of the addressing pin of the chip comprises at least three of coupling with a power supply terminal, coupling with a ground terminal, coupling with the communication input pin of the chip, coupling with the communication output pin the chip, and floating.

15. The method of claim 13, wherein the addressing pins of the all chips in the same communication channel perform same connection, and the addressing pins of the chip in the different communication channels perform different connections.

16. The method of claim 13, wherein the addressing pins of the first chips in the different communication channels perform different connections, and the addressing pins of a second chip to a last chip in the all communication channels perform same connection.

17. The method of claim 13, wherein the addressing pins of the first chips in the different communication channels perform different connections, and the addressing pins of a second chip to a last chip in the all communication channels perform arbitrary connections.

18. The method of claim 15, further comprising:

a) transmitting a communication data packet comprising column address data and row address data by the master device, wherein each chip in the communication channel when receiving the communication data packet serves as a current chip;

b) receiving the communication data packet from the master device or a previous chip and respectively comparing the column address data and the row address data in the communication data packet received by the current chip with the column address and a row address of the current chip by the current chip in each communication channel;

c) when the column address data and the row address data respectively match the column address and the row address, regarding the current chip as a target chip in the communication and implementing corresponding commands in the communication data packet by the target chip; and d) when the column address data does not match the column address and/or the row address data does not match the row address, forwarding the communication data packet received by the current chip to a next chip by the current chip, wherein the current chip does not modify the column address data in the communication data packet received by the current chip.

19. The method of claim 16, further comprising:

a) transmitting a communication data packet comprising column address data and row address data by the master device, wherein each chip in the communication channel when receiving the communication data packet serves as a current chip;

b) receiving the communication data packet from the master device or a previous chip and respectively comparing the column address data and the row address data in the communication data packet received by the current chip with the column address and a row address of the current chip by the current chip in each communication channel;

c) when the column address data and the row address data respectively match the column address and the row address, regarding the current chip as a target chip in the communication and implementing corresponding commands in the communication data packet by the target chip; and d) when the column address data does not match the column address and/or the row address data does not match the row address, modifying the column address data in the communication data packet received by the current chip and forwarding the modified communication data packet to a next chip by the current chip.

20. The method of claim 13, further comprising, in the address configuration time interval, receiving a PWM signal by the communication input pin or the communication output pin of the chip to identify the connection that the addressing pin is coupled with the communication input pin or the communication output pin.

* * * * *